C. HOULDEN.
HARVESTING MACHINE.
APPLICATION FILED DEC. 15, 1915.
1,204,356.
Patented Nov. 7, 1916.
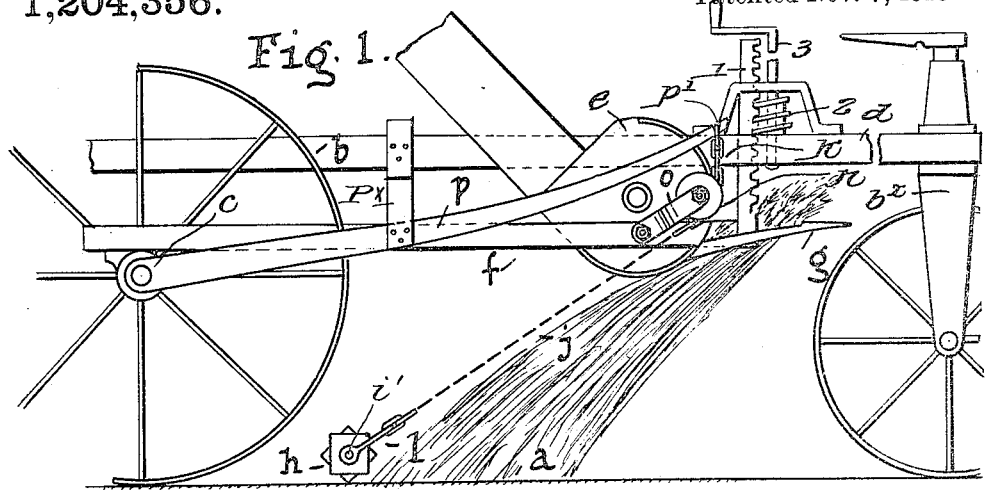
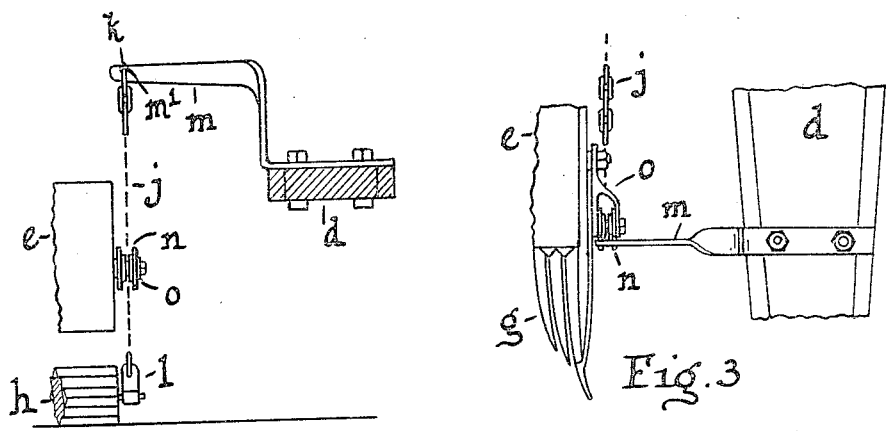
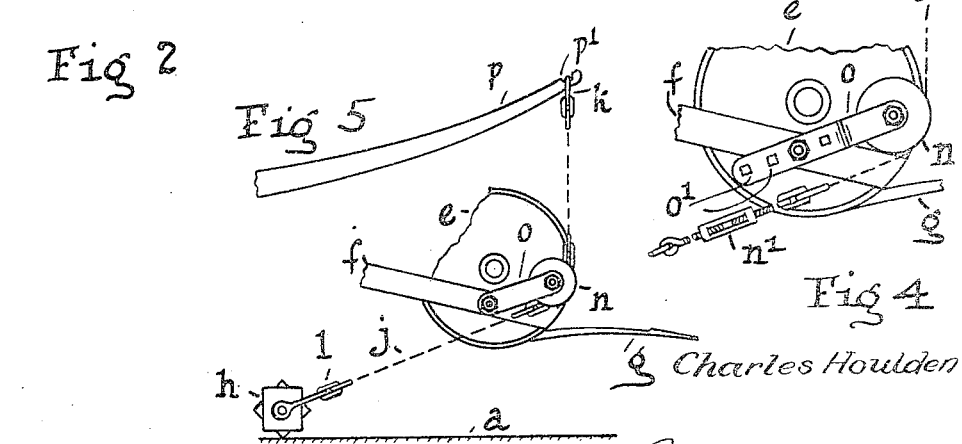
Charles Houlden

UNITED STATES PATENT OFFICE.

CHARLES HOULDEN, OF CREEK VIEW, VICTORIA, AUSTRALIA.

HARVESTING-MACHINE.

1,204,356.

Specification of Letters Patent.

Patented Nov. 7, 1916.

Application filed December 15, 1915. Serial No. 67,026.

*To all whom it may concern:*

Be it known that I, CHARLES HOULDEN, a subject of the King of Great Britain and Ireland, &c., residing at Lincoln estate, Creek View, in the State of Victoria, Commonwealth of Australia, have invented certain new and useful Improvements in Harvesting-Machines; and I do hereby declare the following to be a full, clear, and exact description of the invention, such as will enable others skilled in the art to which it appertains to make and use the same.

My invention relates to a harvesting machine ground roller which holds down the butts of the stalks of the crop to be harvested when the beaters of the machine strike off the heads. Such a roller reduces or prevents choking of the comb by preventing badly rooted stalks being pulled out of the ground; and crudely suspended rollers have already been used. But according to my construction the roller avoids downward drag on the beater drum, to which the roller is not hung. My device also leaves the beater drum height easy to adjust; and another advantage is that as the drum is moved lower or higher, the roller moves also so as to keep in a good position for holding down the crop stalks. Thus the higher the drum and comb the farther back from it will the roller be; and that position suits long stalks. And when the drum and comb are lowered producing a more forward location of the roller relatively to the beater, that suits short stalks.

In the drawings herewith the application of the invention is diagrammatically illustrated.

Figure 1 is an elevation of a part of a harvesting machine, the beater drum shown in raised position. Fig. 2 is a detail front elevation partly in section of the drum and one of the roller chains and its support. Fig. 3 is a detail plan view of the parts shown in Fig. 2. Fig. 4 is an enlarged detail elevation of a different form of the invention. Fig. 5 is a detail in elevation, illustrating the beater drum lowered to harvest short crops.

In the drawing, $a$ indicates the surface of a field, showing a part of the crop.

$c$ indicates an axle of a harvesting machine, and mounted on said axle is a side supporting wheel $b$. The axle supports a frame, and mounted thereon is a front carriage $b^\times$, the carriage being provided with the usual steering device. Pivoted on the axle $c$, is a frame $f$, carrying the usual beater drum $e$, and the parts associated therewith. Extending from below, and forwardly of the beater drum, is the comb $g$, which engages the upper portion of the crop, as shown in Fig. 1. The frame $f$ may be raised and lowered in any suitable manner, the means shown comprising a rack $i$, extending from the frame $f$, and engaged by a worm 2, the worm being operated by a crank handle 3. These features form no part of my present invention, and are simply shown for the purpose of illustrating the application of the improvement.

$h$ represents a ground roller, preferably angular in cross section, and is adapted to hold down the crop stalk butts as the machine passes over the ground. The ground roller is supported by a pair of chains $j$, the lower ends of the chains having bearings $l$, for the trunnions $l^1$, extending from the roller. The upper end of one of the chains is hung in a notch $p^1$, formed in an arm $p$, mounted on the axle $c$, and held rigid with the frame by a suitable brace $p^\times$. The other chain $j$ is hung in a notch $m^1$, formed in an arm $m$, which is secured to the frame $d$, as shown clearly in Fig. 2.

Each chain or the like is in my preferred construction made to pass over a guide $n$, which is supported as by a member attached to the drum or some part of the machine conveniently near the said drum and movable therewith as to height. Thus there is a bracket or strap $o$ carrying the pulley or guide $n$, and this bracket or strap is attached at the end of the beater drum. But owing to the many variations which exist in regard to the minor details of harvesting machine construction the details of my construction will also be varied, as to the designs, positions, numbers and modes of connection of the parts; but without departing from the spirit of what is described, and hereinafter claimed.

To allow of regulation of the roller position the length of each chain is in some cases made adjustable; and thus Fig. 4 shows at $n^1$ a turnbuckle, and at $o^1$ extra holes for fixing the part $o$ more or less forward relatively to the drum. A simple mode of adjustment also available consists in engaging a selected chain link with the notch $p^1$ or $m^1$, that is with the supporting part of the arm $p$ or $m$ which carries the chain.

Having described this invention what is claimed by Letters Patent is:—

1. In a harvesting machine, the combination of a vertically adjustable comb mounted on the forward end of the harvester, fixed supports adjacent the comb, flexible connections suspended from the fixed supports, guides adjacent the comb over which the flexible connections pass, and a rotary ground roller mounted at the lower ends of the flexible supports, the flexible connections being longer than the vertical height of the comb above the ground, whereby the butt ends of the stalks of the crop are held down.

2. In a harvesting machine, the combination of a frame, a comb carried by the frame, means for vertically adjusting the frame and comb, guide rollers supported on the frame, fixed supports on the machine, a ground roller in rear of the comb, chains connected at their upper ends to the fixed supports and passing over the guide rollers, bearings at the lower ends of the chains, said ground roller being mounted in said bearings, and means for adjusting the length of the chains.

3. In a harvesting machine, the combination of a comb, supports extending from the comb, guide rollers mounted on said supports, means for adjusting the supports, fixed supports on the machine, chains connected to the fixed supports and extending over the front of the guide rollers and to the rear thereof, means carried by the chains for adjusting the length thereof, and a ground roller mounted at the lower ends of the chains, said roller holding down the stalks of the crop when the comb is acting on said crop.

In witness whereof I have hereunto set my hand.

CHARLES HOULDEN.

Copies of this patent may be obtained for five cents each, by addressing the "Commissioner of Patents, Washington, D. C."